(No Model.) 3 Sheets—Sheet 2.
G. W. COMBS.
METHOD OF AND APPARATUS FOR BOLTING FLOUR, MEAL, &c.
No. 507,971. Patented Oct. 31, 1893.
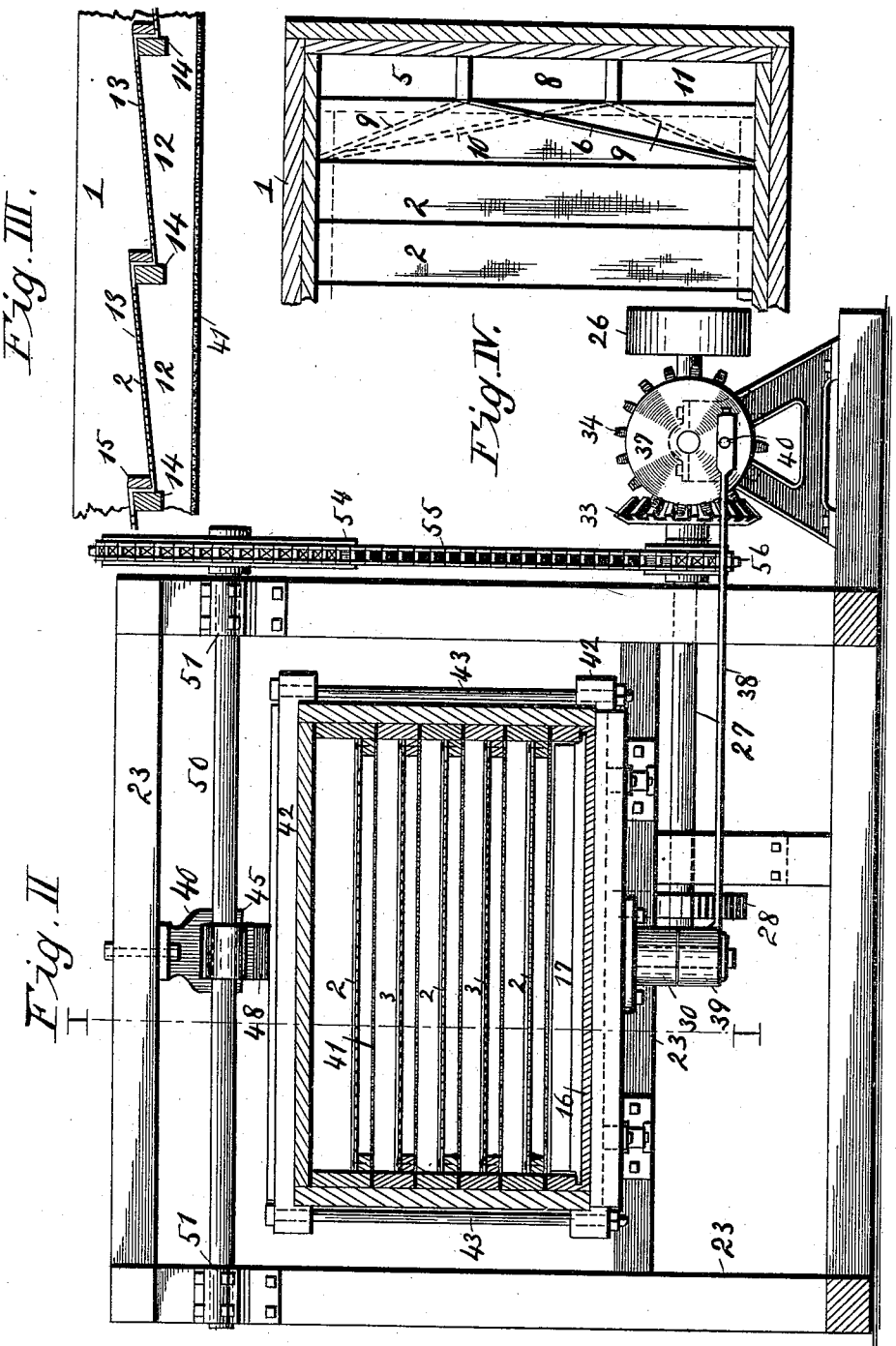
Witnesses:
F. G. Fischer
Geo. E. Cruse
Inventor:
Geo. W. Combs
By Knight Bros.
Attys.

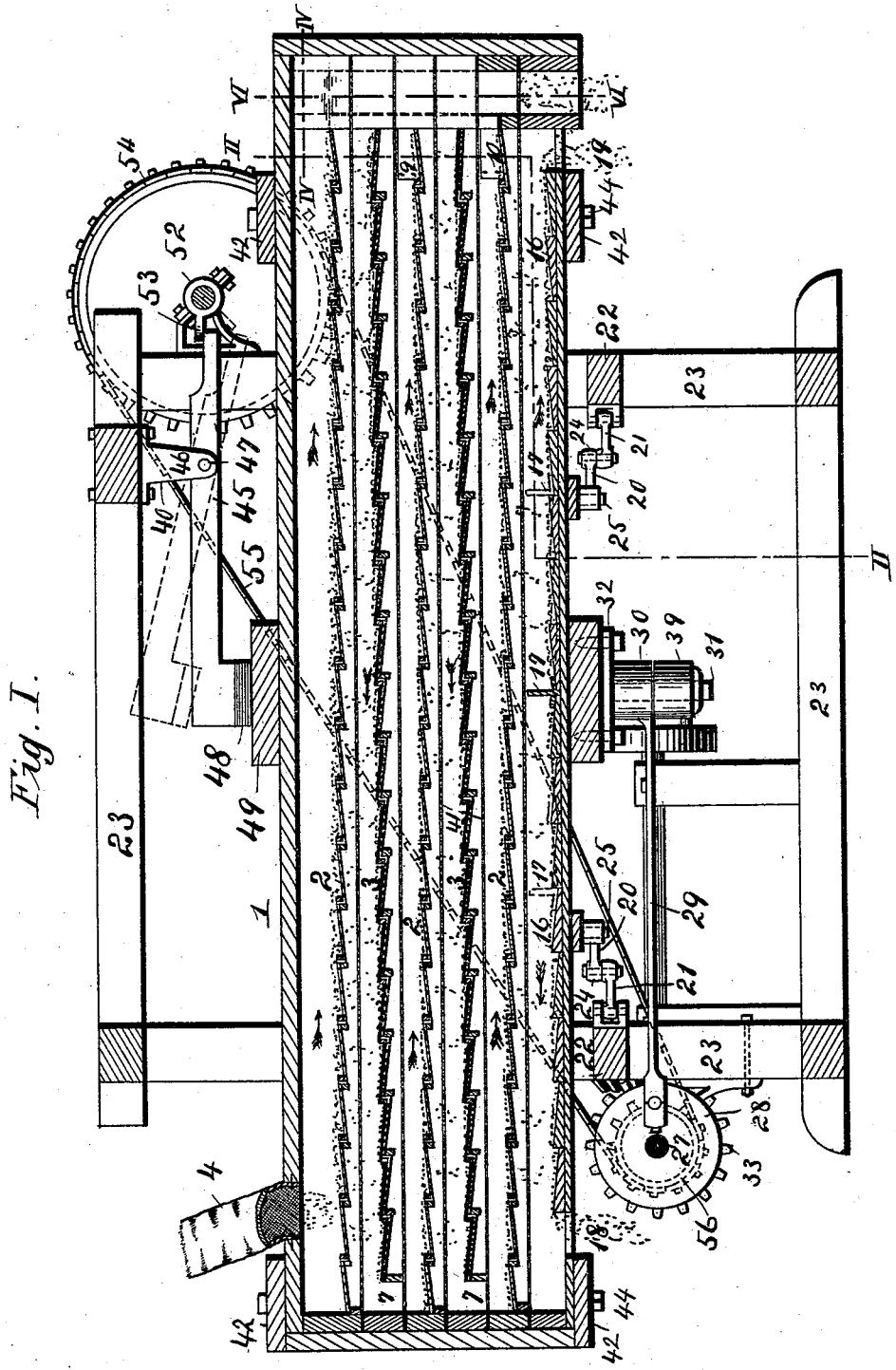

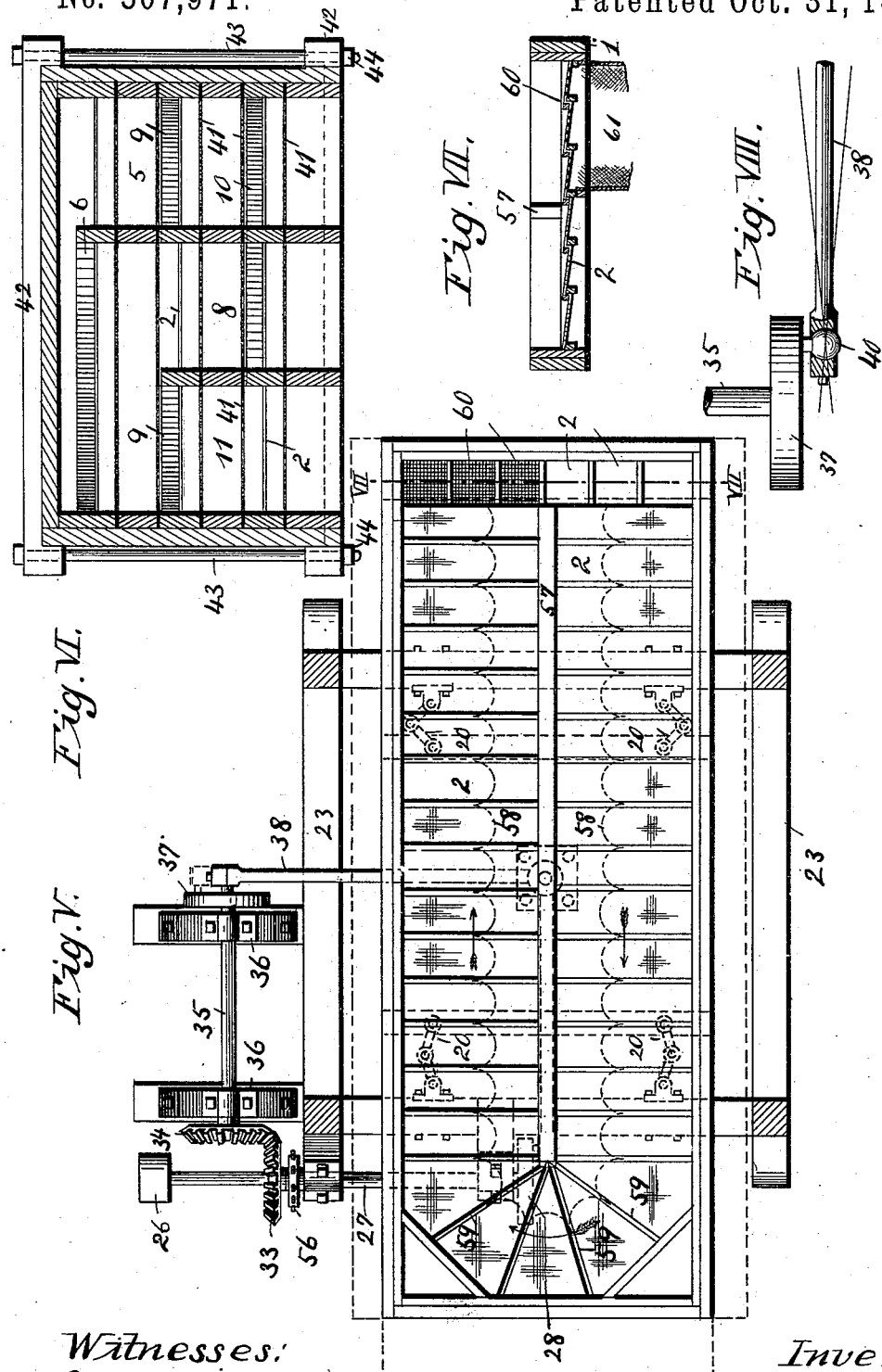

UNITED STATES PATENT OFFICE.

GEORGE W. COMBS, OF LEAVENWORTH, KANSAS.

METHOD OF AND APPARATUS FOR BOLTING FLOUR, MEAL, &c.

SPECIFICATION forming part of Letters Patent No. 507,971, dated October 31, 1893.

Application filed May 27, 1892. Serial No. 434,642. (No model.)

*To all whom it may concern:*

Be it known that I, GEORGE W. COMBS, of Leavenworth, in the county of Leavenworth and State of Kansas, have invented certain new and useful Improvements in Methods of and Apparatus for Bolting Flour, Meal, &c., of which the following is a full, clear, and exact description, reference being had to the accompanying drawings, which form a part of this specification.

My invention relates to a certain new and useful method of bolting or sifting flour, meal, &c., in connection with an improved apparatus for carrying out such method; and my invention consists in certain features of novelty hereinafter described and pointed out in the claims.

Figure I, represents a longitudinal section of my improved sieve taken on the line I—I, Fig. II. Fig. II, is a transverse section taken on line II, II, Fig. I. Fig. III is an enlarged detail section showing the manner of securing the bolting cloth to the sieve. Fig. IV, represents a section taken on line IV, IV, Fig. I. Fig. V, represents a plan view of the mechanism for operating the sieve, and showing a modification of the sieve. Fig. VI, is a vertical, transverse section taken on line VI, VI, Fig. I. Fig. VII, is a vertical, transverse section taken on line VII, VII, Fig. V. Fig. VIII, is an enlarged detailed view showing the wrist pin and ball and socket joint in connecting the operating shafts with the eccentric by which they are driven.

Referring to the drawings, 1, represents a box in which a series of sieves 2, and a series of conveyers 3, are located.

The stock, after being passed through the rollers or first breaks, descends through a chute 4, and is deposited on the upper sieve 2, composed of suitable bolting material, through which the finer portions of the stock are sifted onto the upper conveyer 3, the coarser particles traveling along the upper sieve 2, in the direction shown by arrows, to the end of said sieve where it tails over into a chute 5, from whence it is conveyed to an additional pair of rolls or second break.

6, represents a wing leading from one side of the sieve box 1, to the inner edge of the chute 5, for conveying the material that tails over from the upper sieve to said chute. The stock that is bolted through the upper sieve 2, drops upon the conveyer 3, having its surface composed of non-bolting material, which conveys the stock back to the opposite end of the sieve box and discharges it through an opening 7, onto the sieve below, when it is again subjected to the sifting operation, the finer particles passing through onto a similar conveyer, the coarser particles passing off of the sieve at the opposite end is discharged into a chute 8, similar to the chute 5, thence to be conveyed to the proper place for further treatment, and so on throughout the series of sieves and conveyers, the stock being passed back and forth in the sieve box, and the flour sifted through to the bottom of the box, while the coarser particles are tailed over into the various chutes and conveyed away for further treatment.

9, represents wings for conveying the tailed over material from the second sieve to the chute 8; and 10, represents a wing for directing the tailed over material from the last sieve to a chute 11, there being a chute provided for each sieve placed within the box.

I do not confine myself to the number of sieves, conveyers or chutes used, the number shown sufficiently setting forth the principle of my improved device. The sieves 2, are composed of a strip of bolting material 12, of a greater or less degree of fineness, the coarser material being on the upper sieve and gradually growing finer on each succeeding sieve. Both the sieves 2, and conveyers 3, are formed of a series of short inclines 13, which are formed in the following manner, the bolting material passing over a series of transverse bars 14, extending across the sieve box, said bolting material being secured to the bars 14, by strips 15, (see Fig. III) by which one portion of the bolting cloth adjacent to the bars 14, is depressed below the top of the bars 14, according to the width of the strip 15, the top of the strip 15, being on a line with the top of the bolting cloth 12, which passes over the top of the bars 14, each section of the incline being thus depressed at one of its ends, and passing over the top of the bars 14, at the opposite end, thus forming a series of said inclines throughout the length of the sieve that acts as a conveyer for the coarser material, while the finer material is being sifted through onto the conveyer beneath. The conveyer is formed in exactly the same manner as the sieves, with the exception that the material over which the stock travels is of a finer or nonsifting surface, thereby conveying the stock back to the opposite end of the sieve, to be re-sifted by the next sieve below. The inclines of the conveyer, however, point in the opposite direction from those of the sieve, in order to convey the material in the opposite direction. At the bottom of the sieve box 1, is placed a series of inclined strips 16, a portion of which point in one direction and a portion pointing in the opposite direction, said inclines being separated by a division board 17, the purpose of said inclines being to convey the pure flour to one end of the sieve, whence it is discharged through an opening 18, and to convey any stock that is not good flour to the opposite end of the sieve and discharged through an opening 19, where it can be conveyed away for further treatment or otherwise disposed of. The division board 17, and inclines 16, are movable, as shown by dotted lines, Fig. I, so that the inclines pointing in one direction may be moved at any distance desired to either side of the center of the sieve, according to the grade of flour being discharged thereon, the strips at one end being readily removed and turned around and placed at the other end of the sieve box, thus presenting their angles in a different direction.

The sieve box is supported by toggle arms 20, 21, the outer ends of the toggle arms 21, being pivoted to a bracket 22, on the supporting frame 23, the toggle arms 20, 21, being pivoted to each other, as shown at 24, the inner end of the toggle arm 20, being pivoted to a pin 25, on the bottom of the sifting box 1.

The sifting box, in order to cause the stock to travel over the seives is given a circular, vibrating motion, the toggle arms, 20, 21, permitting the same to be readily moved in any desired direction. The circular, vibrating motion is caused by means of a driving pulley 26, on a shaft 27, said shaft 27, having an eccentric 28, on one of its ends, to which is connected a pitman 29, made preferably thin, so as to spring to a slight degree, in order to vibrate the sieve to which said pitman is connected, as shown at 30, to a pin 31, secured to the under side of the sieve, by means of a plate 32, said pitman 29, and the eccentric to which it is connected giving endwise movement to said sifting box.

The shaft 27, is provided with a miter gear 33, which meshes with a miter gear 34, on a shaft 35, having bearings 36. To the opposite end of the shaft 35, is secured an eccentric 37, to which is connected a pitman 38, the opposite end of said pitman being also connected with the pin 31, as shown at 39, said pitman 38, and eccentric 37, giving a sidewise movement to the sifting box. The combined movements of pitman 29, and the pitman 38, in connection with the pivoted toggles move said box in a circular direction, cause the material on the sieves and conveyers to travel in the directions of the incline onto which said material is deposited, and as the motion is imparted to the sieve from the pitmen operating at right angles to each other, a slight irregular or vibrating movement will be given to the sieve, thus materially aiding the sifting operation.

The pitman 38, is secured to the eccentric 37, by a ball and socket joint, as shown at 40, the pitman 29, being connected with the eccentric 28, in the same manner.

Between each section of the sieves and conveyers I place a lining of felt, as shown at 41, to prevent the material from passing between the same, said sieves and conveyers, and the frame of the box being held in close contact with each other by means of clamping bars 42, extending across the bottom and top of the sifting box, and being connected by rods 43, having nuts 44, thereon for adjusting the same.

In order to aid in the sifting operation, I provide a knocker composed of a beam 45, pivoted to a bracket 46, as shown at 47, said bracket being secured to the frame 23. To one end of said knocker, I secure a portion of hard rubber 48, which, when falling, strikes against a cross-bar 49, secured to the sieve box; 52 representing a collar secured to said shaft 50, and 53, a lug on said collar, said lug on each revolution of the shaft 50, coming in contact with one end of the knocker arm 45, depressing said end and raising the opposite end. (See dotted lines, Fig. I.) Then said lug passes out of contact with said knocker arm, and the same is permitted to fall and jar the sifting box, the rubber cushion on said knocker arm preventing too violent action.

54, represents a sprocket wheel on one end of the shaft 50. 55 is a drive chain engaging said sprocket wheel, said drive chain passing over a sprocket wheel 56, on the shaft 27, by which means said drive chain is operated and motion imparted to the shaft 50.

In Fig. V, I have shown a slight modification of my improved device, one of the sieves having a partition 57, the stock being compelled to travel over the sieve 2, in a circular direction, forming a half circle in its travel on each of the said inclines, as shown at 58. At one end of the sieve, the inclines are made radial, as shown at 59, so as to permit the stock to make a turn, as shown by arrow, and to travel back on the opposite side of the partition 57.

60, represents a wire screen through which the stock is discharged as the material arrives at that end of the sieve. The inclines at this point are placed at right angles with the body of the inclines to permit the corn or other cleaning material to travel over the same, and return to the main inclines.

61, represents a chute through which the matter tailed over is permitted to pass off to any desired receptacle.

I have shown but one sieve, but there may be a series, as shown in my preferred plan.

I do not confine myself to the surfaces of the sieves and conveyers being made on an incline, as, if desired, they may be made of other irregular surfaces, for causing the material to travel over the same.

In my modification shown in Fig. V, I may, if found to be desirable, place upon the surface of the sieve, corn or other coarser material in order to aid in causing the material upon the sieve to be sifted in its passage over the same.

I claim as my invention—

1. The combination of a sifting box having a series of sieves with irregular surfaces for conveying the stock in one direction; a series of conveyers of irregular surfaces for conveying stock in an opposite direction, and a series of inclined strips with a division board, said strips being movable in said sifting box, in order to adjust the same to the grade of flour being discharged from the lower sieve; substantially as set forth.

2. The combination of a sifting box, having a series of sieves, composed of vertical propelling walls and inclined surfaces pointing in one direction, a series of conveyers composed of vertical propelling walls, and inclined surfaces of non-sifting material, pointing in the opposite direction and having an opening at one end to permit the sifted material to fall upon the sieve below, chutes leading from each of said sieves, and wings on the sieves for directing the material of each sieve to its chute, substantially as and for the purpose set forth.

3. The combination of a sifting box having a series of sieves; a series of conveyers, and a lining of felt placed between said sieves and conveyers; substantially as and for the purpose set forth.

4. The combination of a sifting-box, a series of sieves, a series of conveyers, a lining of felt, extending the whole length of the sieve-box placed between the said sieves and conveyers, cross-bars at the top and bottom of said sifting-box, and cross-rods connecting the cross-bars, said cross-bars and connecting rods being placed at both ends of the sifting-box, substantially as and for the purpose set forth.

GEORGE W. COMBS.

Witnesses:
SAML. H. WILSON,
JAS. E. KNIGHT.